United States Patent
Blanchard et al.

(10) Patent No.: US 7,108,119 B2
(45) Date of Patent: Sep. 19, 2006

(54) SINTERED SYNCHRONIZING RING

(75) Inventors: Pierre Blanchard, Coublevie (FR); Christophe Durand, Vif (FR)

(73) Assignee: Federal Mogul Operations France SAS, Le la Ruelle (FR)

(*) Notice: Subject to any disclaimer, the term of this patent is extended or adjusted under 35 U.S.C. 154(b) by 19 days.

(21) Appl. No.: 10/964,004

(22) Filed: Oct. 13, 2004

(65) Prior Publication Data
US 2005/0092575 A1    May 5, 2005

(30) Foreign Application Priority Data
Oct. 14, 2003    (FR) .................................. 03 50678

(51) Int. Cl.
*F16D 23/04* (2006.01)
*F16D 13/66* (2006.01)

(52) U.S. Cl. .............................. 192/107 M; 192/53.24; 192/113.36

(58) Field of Classification Search .............. 192/53.54
See application file for complete search history.

(56) References Cited

U.S. PATENT DOCUMENTS

| | | | |
|---|---|---|---|
| 3,034,383 A | * | 5/1962 | Schulte et al. ................ 72/359 |
| 3,578,122 A | * | 5/1971 | Magnier .................. 192/107 R |
| 4,209,086 A | * | 6/1980 | Friedrich .................. 192/53.34 |
| 4,267,912 A | | 5/1981 | Bauer et al. |
| 5,861,565 A | * | 1/1999 | Omiya et al. .................. 75/243 |

FOREIGN PATENT DOCUMENTS

| | | |
|---|---|---|
| DE | 10028472 | 12/2001 |
| EP | 0821175 | 1/1998 |
| EP | 0965769 | 12/1999 |

* cited by examiner

*Primary Examiner*—Richard M. Lorence
(74) *Attorney, Agent, or Firm*—Plevy, Howard & Darcy PC

(57) ABSTRACT

The present invention relates to a synchronizing ring comprising a tapered internal bore provided with sharp axial teeth. The synchronizing ring comprises axial grooves distributed on the tapered internal bore, each groove extending over a surface corresponding to at least three consecutive axial teeth, two successive grooves being separated by at least ten axial teeth.

8 Claims, 1 Drawing Sheet

SINTERED SYNCHRONIZING RING

CLAIM FOR PRIORITY

This application claims the benefit of French Application No. 03/50678, filed Oct. 14, 2003 and is incorporated herein by reference.

BACKGROUND OF THE INVENTION

1. Field of the Invention

The present invention relates to a sintered synchronizing ring of the type used in gear boxes.

2. Discussion of the Related Art

A conventional gear box comprises an input shaft and an output shaft on which are distributed gears. Each gear supported by the input shaft generally permanently is in mesh with a gear supported by the output shaft. When no gear is engaged, that is, at the dead point, one of the gears, called the idle gear, of each pair of meshed gears freely rotates with respect to the associated shaft.

The selection of a gear ratio consists of making one of the idle gears solid with the associated shaft. This is done especially by means of a sliding gear rotated by the shaft supporting the idle gear to be selected and comprising dogs capable of meshing with dogs of the idle gear to make it solid with the shaft. For the meshing of the sliding gear dogs with the idle gear dogs to occur flexibly and smoothly, the rotation speeds of the gear and of the shaft must be equalized. A synchronizing ring capable of cooperating with the idle gear to progressively bring by friction the idle gear to the same rotation speed as the shaft rotation speed before the dogs of the sliding gear mesh with the dogs of the idle gear is thus provided.

FIGS. 1A and 1B respectively are a front view and an enlarged partial cross-section view of a conventional synchronizing ring. The synchronizing ring comprises ramps 10 distributed along its periphery on which the pushing force of the sliding gear (not shown) applies during the speed equalization phase. As visible in FIG. 1B, ramps 10 only extend along a portion of the ring height and flush an end thereof. Further, the ring comprises a thinned down peripheral area 12 which connects to ramps 10.

The synchronizing ring is provided with a tapered central bore 14, the largest diameter being on the side of ramps 10, as visible in FIG. 1B. The tapered bore is intended to cooperate with a tapered end of the idle gear by axial translation of the ring to ensure fast synchronization of the ring and of the gear by friction until the speeds of the tapered portions are equalized.

It is known to use brass, or a brass-based alloy, to form the synchronizing ring. Indeed, brass provides a proper coefficient of friction between the synchronizing ring and the idle gear, especially at the end of the synchronization step.

The components of a gear box are generally lubricated to avoid wearing and jamming. However, the lubrication of the tapered parts of the synchronizing ring and of the gear are incompatible with the desire to obtain a fast synchronization of the two components with respect to each other.

A conventional solution used to improve the synchronization of the synchronizing ring and of the gear consists of providing a threading at the level of tapered bore 14 of the synchronizing ring. Such a threading enables efficient evacuation of the lubrication oil when the synchronizing ring and the tapered end of the gear are brought close to each other and enables faster synchronization of the ring with respect to the idle gear. It is further also known to complete the threading with axial grooves distributed at the level of the tapered bore.

A disadvantage of such a synchronizing ring is that it requires a relatively complex manufacturing process. Indeed, the threading, which provides many undercut surfaces, cannot be obtained by a single casting or sintering operation and must thus be performed by an additional machining step, which increases the ring manufacturing cost. It is thus desired to define a synchronizing ring having a specific shape enabling its forming in a single casting or sintering operation.

Another disadvantage of the previously-described synchronizing ring made of brass or of a brass-based alloy is that a significant wearing of the synchronizing ring can be observed at the level of the dogs, which tends to reduce the ring lifetime. This is essentially due to the mechanical resistance properties of the used brass or brass alloy. It is thus desirable to be able to use a material different from brass, having a lower production cost than brass, and having improved mechanical resistance properties to form the synchronizing ring. It would be desirable to be able to use steel to form the synchronizing ring, which generally has a lower production cost than the production cost of brass and which has improved mechanical resistance properties.

To form a synchronizing ring in a single casting or sintering operation, one possibility is, as described in European patent application EP 0965769 filed by the applicant, to provide axial teeth 16 regularly distributed over the surface of bore 14, as shown in FIGS. 1B and 1C. Indeed, axial teeth 16 offer no undercut surface and can thus be obtained by sintering or casting with no additional machining operation. To obtain adequate friction properties especially enabling use of a steel to form the synchronizing ring, sharp teeth 16 arranged along the axial direction of the ring, which prevent any jamming phenomenon between the ring and the tapered end of the gear, are provided.

FIG. 2 shows curves of the variation of friction coefficient $\mu$ between the synchronizing ring and the tapered end of the gear in a synchronization step of duration $\Delta T$. The curve in dotted lines 20 shows the desired variation of the friction coefficient in a synchronization step and approximately corresponds to the variation of the friction coefficient for a brass synchronizing ring comprising a central threaded tapered bore and a steel tapered end. For such a curve, friction coefficient $\mu$ increases rapidly towards an optimal friction coefficient $\mu_{OPT}$ and stabilizes at this value. The optimal friction coefficient corresponds to a compromise between a friction coefficient sufficiently high to enable fast synchronization and a coefficient low enough to avoid any jamming.

The variation of the friction coefficient for the synchronizing ring shown in FIGS. 1A to 1C, that is, for a steel synchronizing ring having its central bore 14 comprising sharp axial teeth 16, is shown by curve 22 in full line. It can be acknowledged that the increase of the friction coefficient up to optimal coefficient $\mu_{OPT}$ is slower than for curve 20 and that, at the end of the synchronization, the friction coefficient tends to exceed optimal coefficient $\mu_{OPT}$. A phenomenon substantially opposite to that which can be observed with a steel synchronizing ring with a threaded internal bore for which the friction coefficient tends to keep a value smaller than optimal coefficient $\mu_{OPT}$ is thus obtained at the end of the synchronization.

Regarding curve 22, the delay taken by the friction coefficient to reach optimal coefficient $\mu_{OPT}$ translates as a less efficient synchronization of the ring and of the gear at the beginning of the synchronization, which is not desirable given the short duration of the synchronization step. Further, the value reached by the friction coefficient at the end of the synchronization step corresponds to the static friction coefficient, or adherence coefficient, between the synchronizing ring and the tapered end of the gear, and is thus representative of the efforts which will have to be subsequently made to separate the synchronizing ring from the tapered end of the gear. It is thus not desirable for such a value to be too high.

SUMMARY OF THE INVENTION

An object of the present invention is to obtain a synchronizing ring with axial teeth for which the friction coefficient between the ring and an idle gear settles at the level of an optimal friction coefficient at the end of the synchronization.

Another object of the present invention is to obtain a synchronizing ring for which the friction coefficient between the ring and the idle gear rapidly increases towards the optimal friction coefficient at the beginning of the synchronization step.

To achieve these objects, the present invention provides a synchronizing ring comprising a tapered internal bore provided with sharp axial teeth, and comprising axial grooves distributed on the tapered internal bore, each groove extending over a surface area corresponding to at least three consecutive axial teeth, two successive grooves being separated by at least ten axial teeth.

According to another embodiment of the present invention, the cross-section of each groove is rectangular or trapezoidal.

According to another embodiment of the present invention, the number of grooves is greater than or equal to 6.

According to another embodiment of the present invention, the grooves on the ring periphery are uniformly distributed on the tapered internal bore.

According to another embodiment of the present invention, the apexes of the teeth comprise a flat surface with a width smaller than 0.2 millimeter.

According to another embodiment of the present invention, the spacing of the teeth is smaller than 0.7 millimeter.

According to another embodiment of the present invention, the height of the teeth is smaller than 0.4 millimeter.

According to another embodiment of the present invention, the synchronizing ring is sintered.

According to another embodiment of the present invention, the synchronizing ring is made of steel.

The foregoing and other objects, features, and advantages of the present invention will be discussed in detail in the following non-limiting description of specific embodiments in connection with the accompanying drawings, among which:

DETAILED DESCRIPTION

Figure 1A:
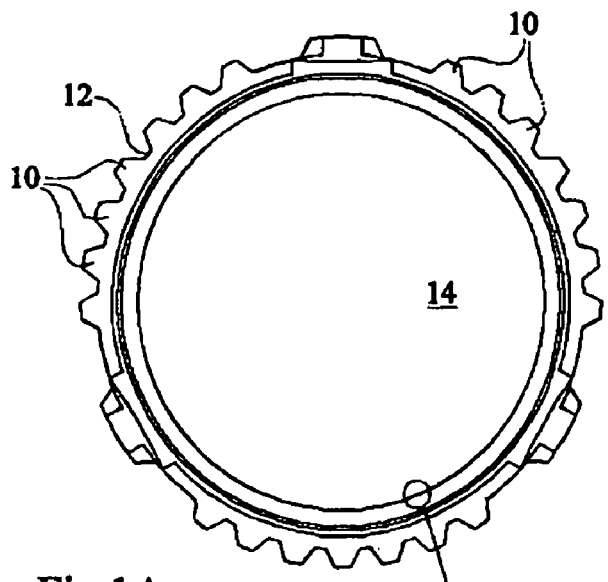
FIGS. 1A to 1C, previously described, respectively are a front view, a partial cross-section view, and a detailed view of a conventional synchronizing ring with axial teeth.
Figure 1B:
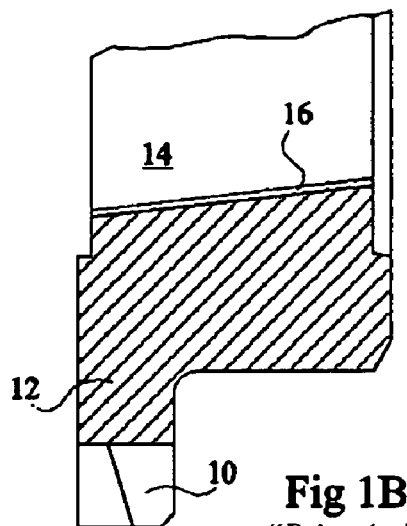
Figure 1C:
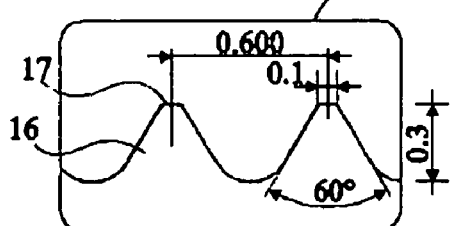

The synchronizing ring according to the present invention comprises an internal bore 14 comprising sharp teeth 16. In practice, the sharpest apexes that can be obtained comprise flat surfaces or roundings which depend on the used manufacturing technique. By a sintering process, apexes comprising a flat surface 17 smaller than 0.2 millimeter, generally on the order of 0.1 millimeter, can be obtained. In the example of a ring shown in FIG. 1C, the teeth have a 0.6-millimeter spacing and a 0.3-millimeter height. Such dimensions are of course variable, but a flat surface smaller than 0.2 millimeter, a spacing smaller than 0.7 millimeter, and a height smaller than 0.4 millimeter are generally chosen.

Figure 3A:
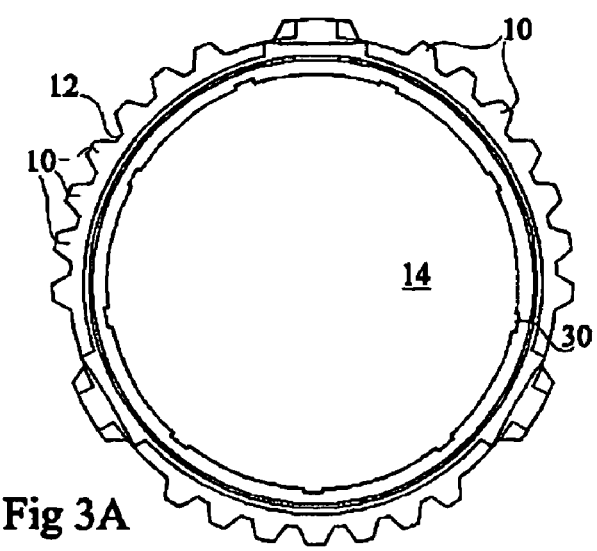
FIGS. 3A and 3B respectively are a front view and a simplified cross-section view of an example of the forming of a synchronizing ring according to the present invention.
Figure 3B:
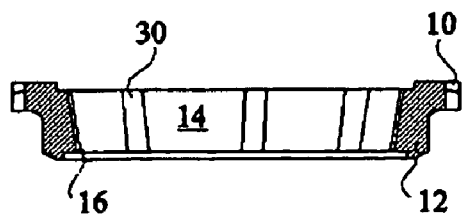

According to the present invention, grooves 30 which extend along the axis of central tapered bore 14 are provided at the level of central tapered bore 14, in addition to axial teeth 16. In a plane perpendicular to the ring axis, each groove 30 extends over an arc of a circle having a length greater than the length of an arc of a circle corresponding to at least three consecutive axial teeth 16. As an example, for a synchronizing ring having a central tapered bore 14 with an average diameter of approximately 50 millimeters, each groove 30 extends over an arc of a circle having a length smaller than the length of an arc of a circle corresponding to some ten consecutive axial teeth 16. Of course, the upper limit of the length of the arc of a circle on which each groove 30 extends depends on the average diameter of central tapered bore 14 of the synchronizing ring. The cross-section of grooves 30, in a plane perpendicular to the axis of the synchronizing ring, is for example rectangular, trapezoidal, V-shaped, U-shaped, etc. The cross-sections of grooves 30 are, preferably, identical. The number of grooves 30 and their relative position vary according to the strain exerted on dogs 10, especially in a synchronization step. However, two successive grooves 30 are at least separated by ten axial teeth 16. In the example shown in FIG. 3A, nine grooves 30 are shown to be uniformly distributed over the circumference of central tapered bore 14. Preferably, the synchronizing ring with axial teeth 16 according to the present invention comprises at least six grooves 30.

The applicant has shown that the presence of grooves 30 enables retaining a given amount of oil so that a sufficient oil film maintains at the end of a synchronization step between teeth 16 of the synchronizing ring and the tapered end of the idle gear, to avoid an abrupt increase in the friction coefficient between the synchronizing ring and the idle gear. The friction coefficient then tends to remain, at the end of the synchronization step, substantially constant and equal to optimal friction coefficient $\mu_{OPT}$.

The applicant has also shown that the presence of axial grooves 30, associated with axial teeth 16, enables better evacuation of the oil film at the beginning of the synchronization step, causing a faster increase in the friction coefficient towards optimal friction coefficient $\mu_{OPT}$.

Figure 2:
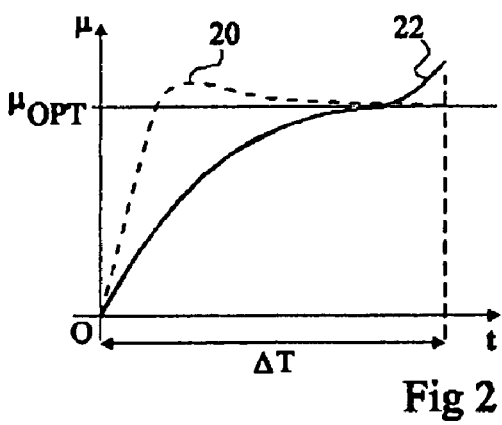
FIG. 2, previously described, shows the variation of the friction coefficient between a synchronizing ring and an idle gear in a synchronization step for two examples of rings.

The presence of grooves 30 thus enables modifying the variation curve of friction coefficient 22 shown in FIG. 2 to have it tend towards optimal curve 20.

The synchronizing ring according to the present invention may advantageously be formed in a steel having improved mechanical resistance properties with respect to the mechanical resistance properties of brass to increase the ring lifetime.

A synchronizing ring according to the present invention will preferably be sintered. Indeed, the shape of grooves 30 may be chosen so that they exhibit no undercut, which enables obtaining a ring completed in a single manufacturing step.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

The invention claimed is:

1. A synchronizing ring comprising a tapered internal bore provided with axial teeth each having a substantially flat apex of a width less than 0.2 millimeters, and axial grooves distributed on the tapered internal bore, each groove extending over a surface corresponding to at least three consecutive axial teeth, two successive grooves being separated by at least ten axial teeth.

2. The synchronizing ring of claim 1, wherein the cross-section of each groove is rectangular or trapezoidal.

3. The synchronizing ring of claim 1, wherein the number of grooves is greater than or equal to 6.

4. The synchronizing ring of claim 1, wherein the grooves on the ring periphery are uniformly distributed on the tapered internal bore.

5. The synchronizing ring of claim 1, wherein the spacing of the teeth is smaller than 0.7 millimeter.

6. The synchronizing ring of claim 1, wherein the height of the teeth is smaller than 0.4 millimeter.

7. The synchronizing ring of any of the foregoing claims, wherein it is sintered.

8. The synchronizing ring of claim 1 wherein the synchronizing ring is made of steel.

* * * * *